US007722388B1

(12) United States Patent
Michaeli et al.

(10) Patent No.: US 7,722,388 B1
(45) Date of Patent: May 25, 2010

(54) SYSTEM FOR A MOBILE UNIT CHARGING AND CONNECTION

(75) Inventors: Ben Michaeli, Stony Brook, NY (US); Bob Kowalski, Commack, NY (US); Quintin Morris, Issaquah, WA (US); Mark Palmer, Port Jefferson, NY (US); Carl Theleman, E. Islip, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/402,107

(22) Filed: Mar. 11, 2009

(51) Int. Cl.
*H01R 13/60* (2006.01)
(52) U.S. Cl. .................................. 439/534; 224/197
(58) Field of Classification Search ......... 439/532–534; 224/197
See application file for complete search history.

(56) References Cited

U.S. PATENT DOCUMENTS

| 5,447,442 | A  | * | 9/1995  | Swart ........................... 439/77 |
| 5,648,712 | A  | * | 7/1997  | Hahn ........................... 320/111 |
| 6,752,299 | B2 | * | 6/2004  | Shetler et al. ................ 224/197 |
| 7,384,302 | B2 | * | 6/2008  | Obata et al. .................. 439/532 |
| 7,510,428 | B2 | * | 3/2009  | Obata et al. .................. 439/533 |
| 7,611,358 | B2 | * | 11/2009 | Cox et al. ...................... 439/65 |

* cited by examiner

*Primary Examiner*—Truc T Nguyen

(57) ABSTRACT

A system provides a charging and a connection for a mobile unit. The system includes a housing of a mobile unit that couples to a latch. The housing comprises a loop and a panel. The loop is disposed on a top portion of the housing and receives a hook of the latch. The panel is disposed on a back portion of the housing and receives a corresponding panel of the latch. The panel includes a first set of electrical contacts that couple to a second set of electrical contacts of the corresponding panel to establish an electrical connection.

19 Claims, 10 Drawing Sheets

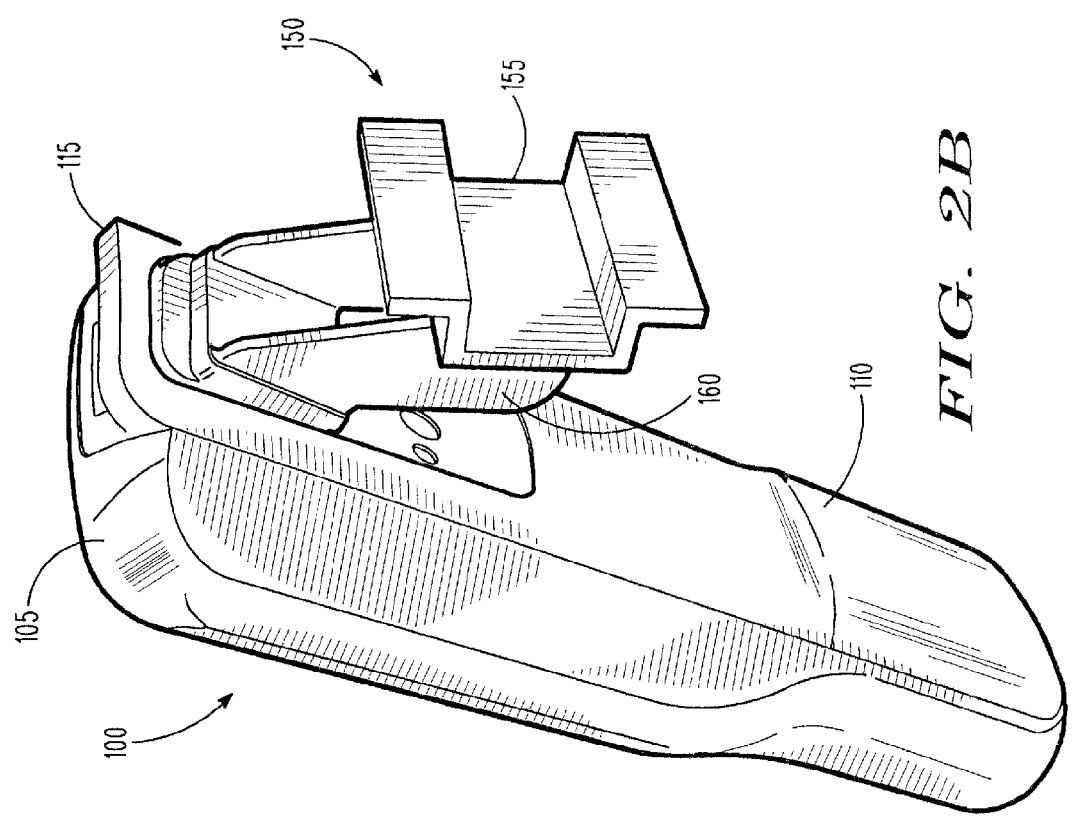

SYSTEM FOR A MOBILE UNIT CHARGING AND CONNECTION

FIELD OF THE INVENTION

The present invention relates generally to a system for a mobile unit charging and connection. Specifically, the mobile unit may include a pivot and hook feature disposed on a top end of the mobile unit to securely position the mobile unit in a position to be charged and establish a connection.

BACKGROUND

A facility may use a plurality of mobile units (MU) deployed therethrough. Depending on a type of facility, the MUs may be provided to employees, customers, or both. The MUs may include a variety of conventional functionalities used by the employees, customers, or both. For example, in a warehouse environment, employees may use the MUs for inventory purposes. In another example, in a retail environment, customers may be provided the MUs to perform sales functionalities such as price checks, locating items, checking out, etc.

The plurality of MUs used in the facility may require a high amount of maintenance. For example, updating all the MUs when upgraded software is used by the network or system requires that each MU receive a respective update. To this end, conventional technologies provide a cradle device in which the MU is inserted to recharge power as well as establish a connection with the network. In order to minimize an amount of space, the cradles may be aligned in rows and columns and mounted on a wall of the facility. However, because the cradle must provide a sufficient amount of surface area as well as the components to establish the connection that are sufficiently strong to hold the MU, the cradles may require a larger amount of space than anticipated. Furthermore, conventional cradle devices face issues relating to high speed connection interfaces as very short cables are preferred but cannot be accommodated.

SUMMARY OF THE INVENTION

The present invention relates to a system for a mobile unit charging and connection. The system includes a housing of a mobile unit that couples to a latch. The housing comprises a loop and a panel. The loop is disposed on a top portion of the housing and receives a hook of the latch. The panel is disposed on a back portion of the housing and receives a corresponding panel of the latch. The panel includes a first set of electrical contacts that couple to a second set of electrical contacts of the corresponding panel to establish an electrical connection.

DESCRIPTION OF THE DRAWINGS

FIG. 2b shows a pivoted position for the latching system of FIG. 1 according to an exemplary embodiment of the present invention.

DETAILED DESCRIPTION

Figure 1:
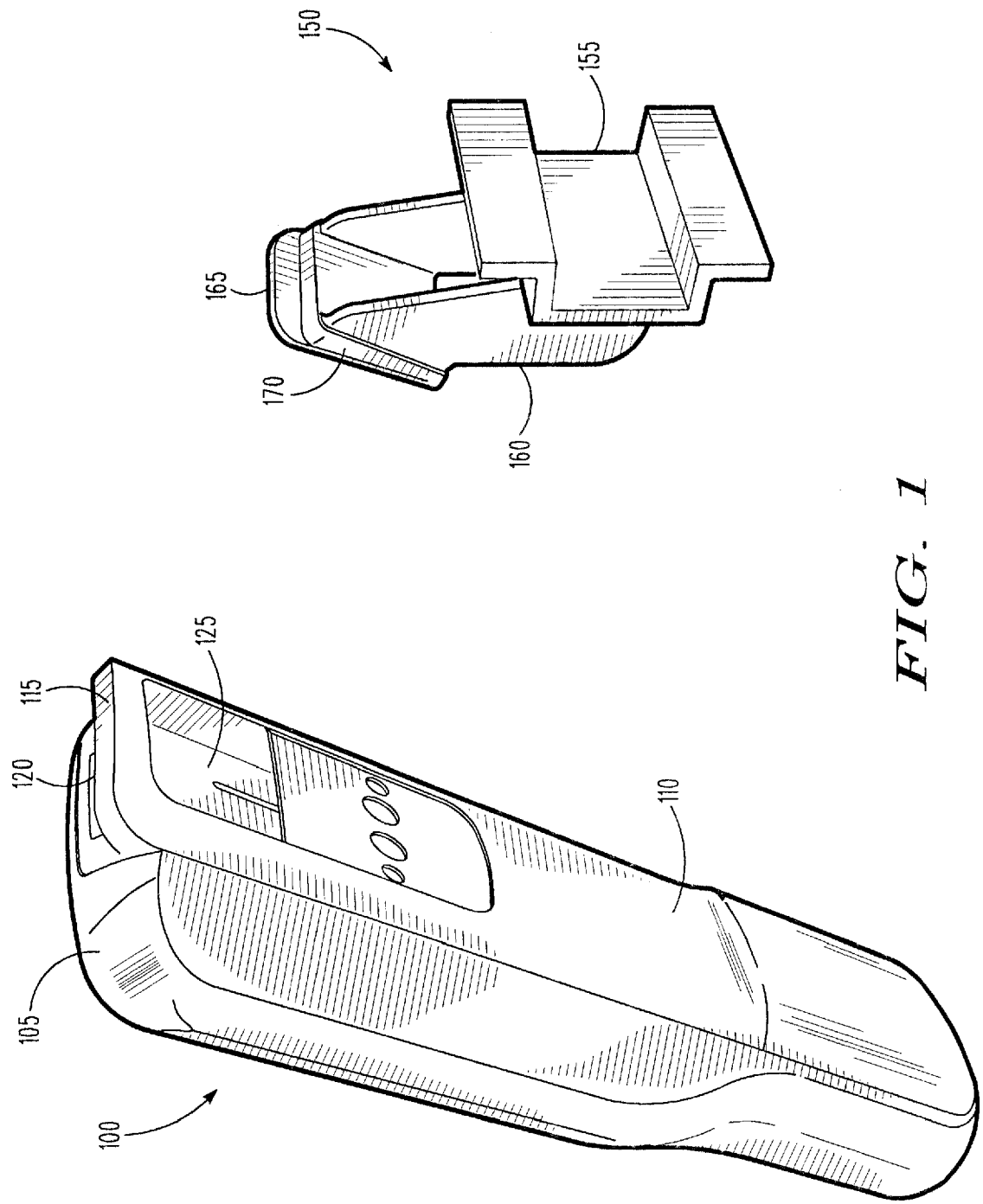
FIG. 1 shows an exploded view of a hook and pivot latching system comprising a mobile unit and a latch according to an exemplary embodiment of the present invention.

The exemplary embodiments of the present invention may be further understood with reference to the following description and the appended drawings, wherein like elements are referred to with the same reference numerals. The exemplary embodiments of the present invention describe a system and method for a secure transaction. According to the exemplary embodiments of the present invention, the system may include a payment receiving device and a payment data storage device. The payment receiving device may include a component that is capable of communicating (e.g., one way or two way transmission) with the payment data storage device. When the payment receiving device is properly authenticated to receive payment data, a secure transaction may take place. The payment receiving device, the payment data storage device, components of the devices, the payment data, and associate methods will be discussed in further detail below.

FIG. 1 shows an exploded view of a hook and pivot latching system comprising a mobile unit (MU) 100 and a latch 150 according to an exemplary embodiment of the present invention. The hook and pivot latching system utilizes a means of assembling the MU 100 with the latch 150 from a substantially top portion 105 of the MU 100.

The MU 100 may be any electronic portable device such as a mobile computer, a personal digital assistant (PDA), a laptop, a scanner, an RFID reader, an image capturing device, a pager, a cellular phone, etc. The MU 100 may include the top portion 105, a back portion 110, a loop 115, and a recess 125. The MU 100 may include further components found in a conventional MU such as a display, a data input arrangement, a data acquisition device, a transceiver, etc.

The MU 100 may include a housing that wholly houses internal components that may be susceptible to damage (e.g., an integrated circuit board, a transceiver, etc.) and/or at least partially houses external components (e.g., a display, a data input arrangement, an antenna, etc.). The top portion 105 may be relative according to a disposition of the MU 100 as it is positioned by a user. When the MU 100 is held right side up, the display and the data input arrangement may be arranged to be seen by the user. In this position, the top portion 105 is a top panel of the housing. The back portion 110 may also be relative according to a disposition of the MU 100. When the MU 100 is held right side up so that the display and the data input arrangement face the user, the back portion 110 is in an opposite side of the display. The housing, in particular the top portion 105 and the back portion 110, may be manufactured with a predetermined shape to accommodate the hook and pivot latching system according to the exemplary embodiments of the present invention. As will be described in further detail below, the top portion 105 may be designed with the loop 115 extending therefrom with the back portion 110 including a recess 125 to receive a portion of the latch 150.

The loop 115 may be an extension of the top portion 105 that facilitates at least the hooking aspect of the hook and pivot latching system. The loop 115 may include a via 120 that receives a portion of the latch 150, thereby creating a hooking effect. It should be noted that the use of the via 120 is only exemplary. According to other exemplary embodiments and as will be described in a further exemplary embodiment according to the present invention, the loop 115 may include a recess. That is, the via 120 may be covered, thereby creating the recess. However, it is noted that whether the via 120 is open or is covered and becomes a recess, this portion will be referred as the via 120.

The loop 115 may be contoured to receive the portion of the latch 150. For example, curved corners may be used for the loop 115 to facilitate a smooth receiving of the portion of the latch 150. That is, the via 120 may include the curved corners. However, in other exemplary embodiments, to guarantee a snug fit and a more rigid assembly of the hook and pivot latching system, the loop 115 may be contoured in a different manner (e.g., perpendicular corners). The contour of the loop 115 and the via 120 may also facilitate the pivoting aspect of the hook and pivot latching system. For example, the contour of the loop 115 on an underside may be curved so that the portion of latch 150 contacting the loop 115, upon hooking, may pivot around the loop 115 and the via 120 for assembly.

The recess 125 may be a flat panel that receives another portion of the latch 150. The recess 125 may include a surface area that provides a supporting surface to prop the MU 100 in an angled position. The angled position upon assembly will be described in further detail below with reference to FIGS. 2b-3. The recess 125 may further include electronic and physical components. The electronic components may enable an electrical connection to be established between the MU 100 and the latch 150 so that data and power may be exchanged. The physical components may enable a locking mechanism so that when the MU 100 and the latch 150 are assembled, the MU 100 is placed securely onto the latch 150.

The latch 150 may be a corresponding component of the hook and pivot latching system for the MU 100 according to the exemplary embodiments of the present invention. The latch 150 may include an attaching component 155, an extension 160, a hook 165, and a panel 170.

The latch 150 may be part of a variety of scenarios. In a first example, the latch 150 may be part of a wall rail in which a plurality of latches 150 are placed in predetermined positions to each connect with a MU 100. In a second example, the latch 150 may be for an automobile accessory. In a third example, the latch 150 may be for a desk stand. The attaching component 155 may facilitate the latch 150 to be used in conjunction with a corresponding part for the various scenarios. That is, the attaching component 155 may be part of a locking mechanism to place the latch 150. In the first example, the attaching component 155 may be connected to the wall rail. In the second example, the attaching component 155 may be connected to a vent of the automobile. In the third example, the attaching component 155 may be connected to the desk stand.

The latch 150 may include an extension 160 from the attaching component 155. The extension 160 may provide a support for the hook 165 and the panel 170. The extension 160 may also house electronic connectors such as wires. As discussed above, the hook 165 may be the portion of the latch 150 that couples with the loop 115. The hook 165 may substantially be an extension that corresponds to the contour shape of the loop 115. According to the first exemplary embodiment of the present invention and for illustrative purposes to show the assembly of the hook 165 with the loop 115, the hook 165 may be go through the via 120 and extend beyond the via 120. The assembly of the hook 165 with the loop 115 according to the first exemplary embodiment of the present invention will be described in further detail below with reference to FIGS. 2a-b. As discussed above, the panel 170 may be the portion of the latch 150 that couples with the recess 125. The panel 170 may be shaped and configured to be placed within the recess 125. Thus, the panel 170 may include a surface area that is touching the surface area of the recess 125 to provide the support of the assembly. Accordingly, the panel 170 may include corresponding electronic and physical components to the electronic and physical components of the recess 125.

It should be noted that the latch 150 and its components may be configured to be removable. According to the exemplary embodiments of the present invention, the latch 150 may be replaced with an updated latch to correspond to adapt to a different loop feature that may be used for subsequent MUs (e.g., different models yet to be released). It should also be noted that the entire latch 150 may be replaced or select components of the latch 150. When select components of the latch 150 are replaced, the extension 160, the hook 165, and the panel 170 may be replaced while the attaching component 155 is maintained. That is, the loop feature of an updated MU may require a different shape of the hook and panel but the attaching component may continue to be used without replacement.

Figure 2A:
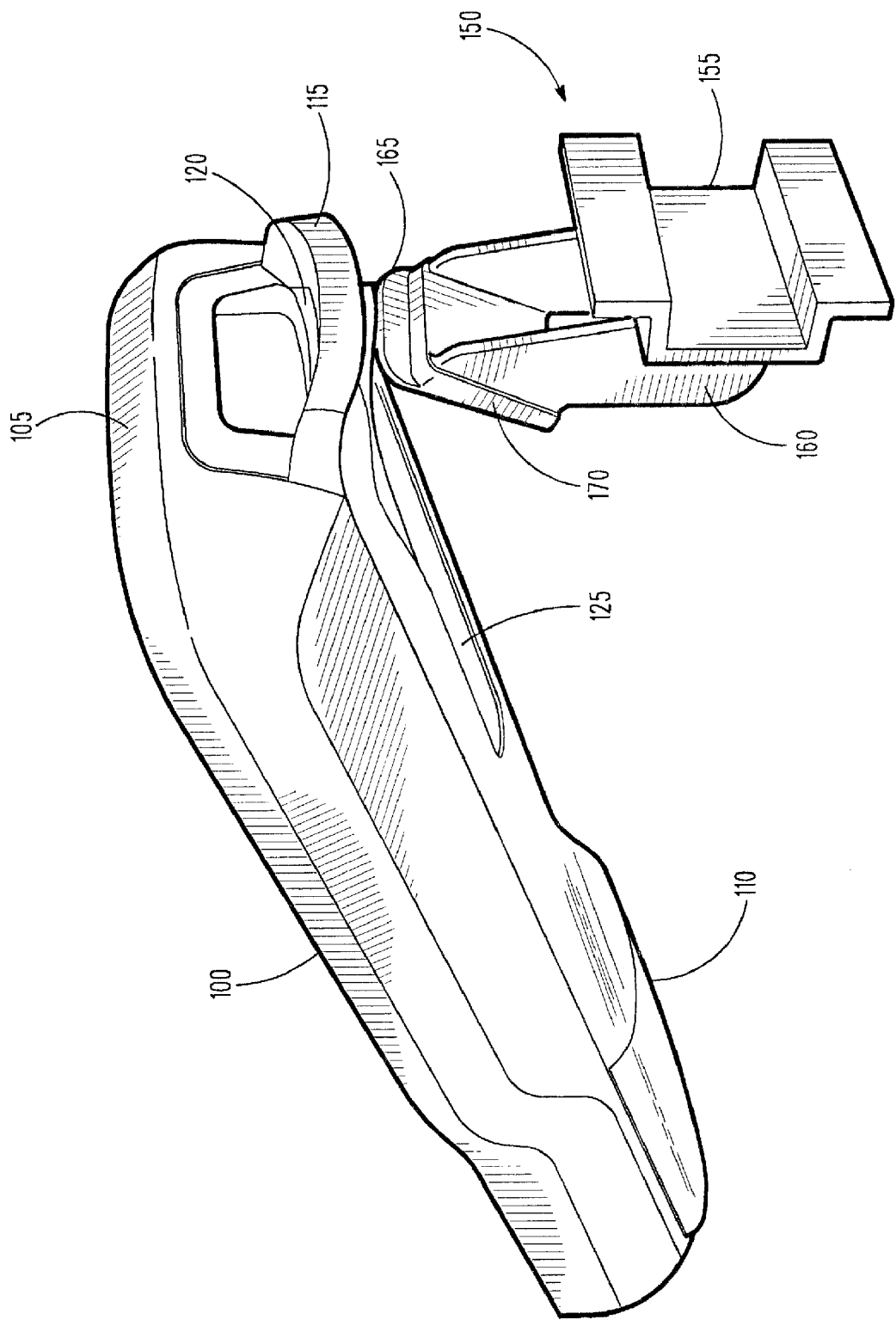
FIG. 2a shows a hooking position for the latching system of FIG. 1 according to an exemplary embodiment of the present invention.

FIG. 2a shows a hooking position for the latching system of FIG. 1 according to an exemplary embodiment of the present invention. The hooking position may be a first step of the hook and pivot latching system. Specifically, the hooking position may be when the hook 165 is received in the via 120 of the loop 115. As illustrated, the latch 150 may be stationary when it is connected via the attaching component 155. The hook 165 may be disposed to face an upward position to facilitate the hooking aspect. Accordingly, the MU 100 may be positioned by a user in a substantially perpendicular position to place the hook 165 through the via 120 of the loop 115. In the hooking position, the recess 125 and the panel 170 are separated.

FIG. 2b shows a pivoted position for the latching system of FIG. 1 according to an exemplary embodiment of the present invention. The pivoted position may also be the assembled view of the hook and pivot latching system according to the exemplary embodiments of the present invention. The pivoted position may be a second step of the hook and pivot latching system. Specifically, the hook 165 may be coupled with the loop 115 and the MU 100 may be rotated (i.e., pivoted) so that the recess 125 receives the panel 170. Thus, the MU 100 may be pivoted around the coupling point of the hook 165 with the loop 115 so that the back portion 110 of the MU 100 is in a substantially parallel disposition to the panel 170 of the latch 150. As discussed above, the recess 125 may include electronic and physical components while the panel 170 may include corresponding electronic and physical components. The connection created between the electronic and physical components of the recess 125 and the panel 170 will be described in further detail below with reference to FIGS. 5*a-c*.

Figure 3:
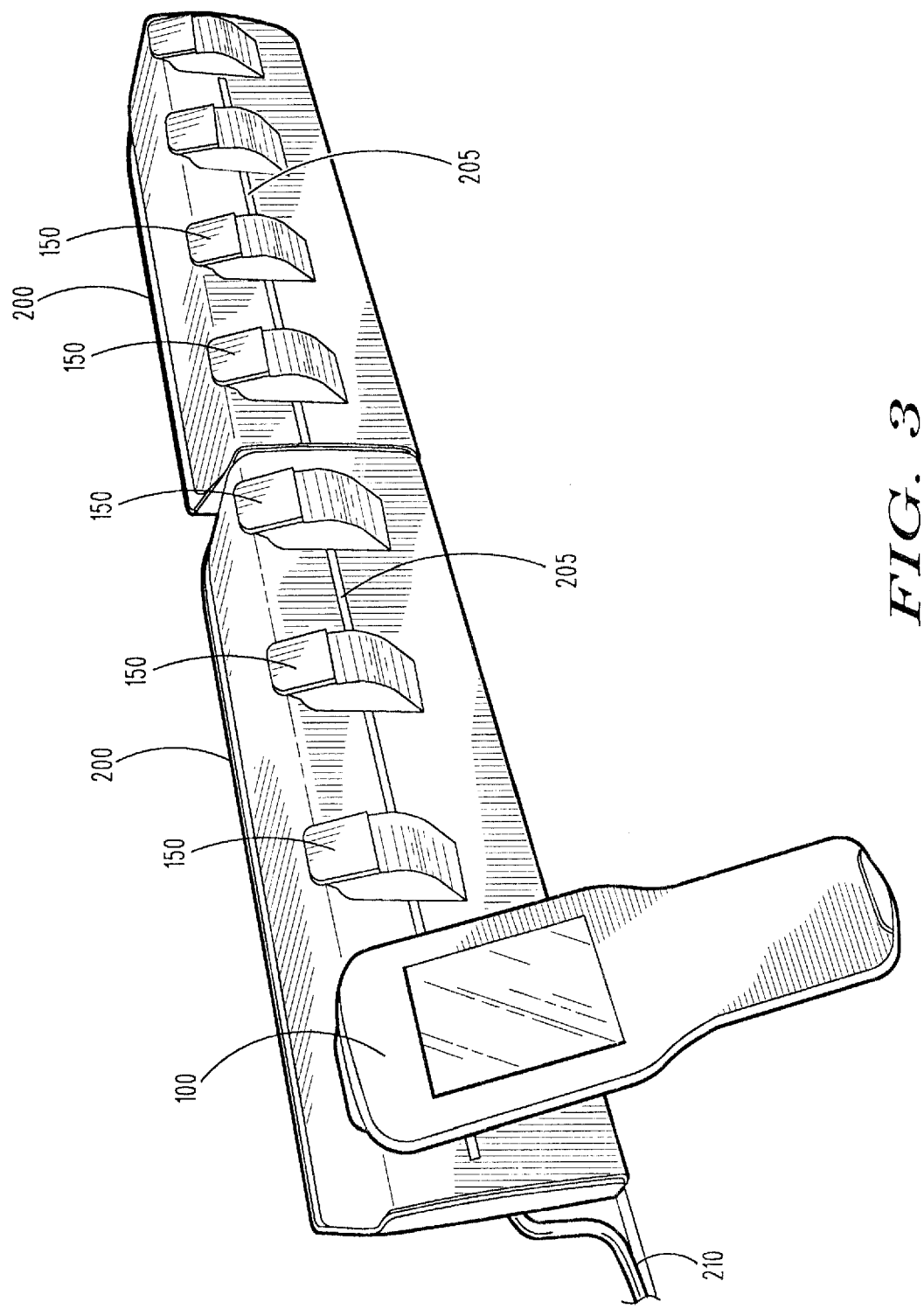
FIG. 3 shows wall rails comprising a plurality of latches according to an exemplary embodiment of the present invention.

FIG. 3 shows wall rails 200 comprising a plurality of the latches 150 according to an exemplary embodiment of the present invention. As discussed above, the latch 150 may be connected to a variety of components respective of the scenario the hook and pivot latching system is used. According to the exemplary embodiment of the present invention, the wall rail 200 may be for a retail facility or warehouse environment where a plurality of MUs 100 are used for employees and/or customers. The wall rail 200 may provide a convenient location for the MUs to be placed for charging and/or updating purposes. As illustrated, the wall rails 200 are placed side-by-side with each wall rail 200 providing four latches 150 for MUs to be coupled. The first latch (not shown) of the left wall rail 200 may be coupled to the MU 100.

It should be noted that further configurations of the wall rails 200 may be used by the facility. For example, further wall rails 200 may be placed in a side-by-side manner. In another example, further wall rails 200 may be placed above and/or below the illustrated wall rails 200. The wall rails 200 may be attached to a rack that supports the coupling of the wall rails 200 thereto.

The wall rail 200 may include a connector 205 that couples with the attaching component 155. Furthermore, as illustrated, the connector 205 may be configured to support couplings of a plurality of attaching components 155 from a plurality of latches 150. The connector 205 may also be configured so that the latches 150 may be movable to a position along the connector 205. The flexibility provided by the connector 205 may enable additional latches 150 to be coupled thereto or may enable latches 150 to be removed to provide more space for each latch 150 still connected thereto. In this manner, each wall rail 200 may support a maximum number of MUs 100 depending on a width of the MU 100. That is, in contrast to cradles that are required to surround the housing of the MU 100 thereby increasing the overall width needed for the cradle, the width of the MU 100 determines the necessary space required instead of the width of the cradle. Accordingly, when wall rails 200 are placed in rows (e.g., above and/or below the illustrated wall rails 200), the height of the MU 100 determines the necessary space required instead of the additional height added from the cradle.

As discussed above and as will be described in further detail below, the extension 160 may house electronic connectors such as wires. The electronic connectors may also be connected to a further electronic connector 210 provided by the wall rail 200. The wall rail 200 may provide connections with the further electronic connector 210 with the electronic connectors of the latches 150 when the attaching component 155 of each latch is coupled to the connector 205 of the wall rail 200.

Figure 4B:
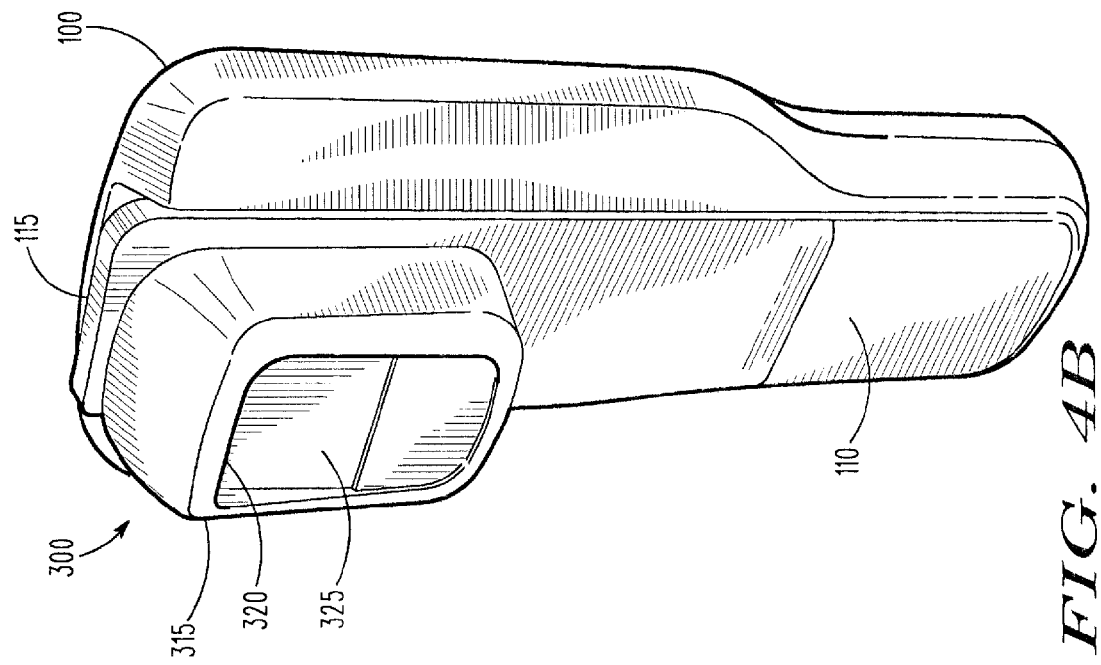
FIG. 4b shows an assembled view of the mobile unit of the latching system of FIG. 1 and the module of FIG. 4a according to an exemplary embodiment of the present invention.
Figure 4A:
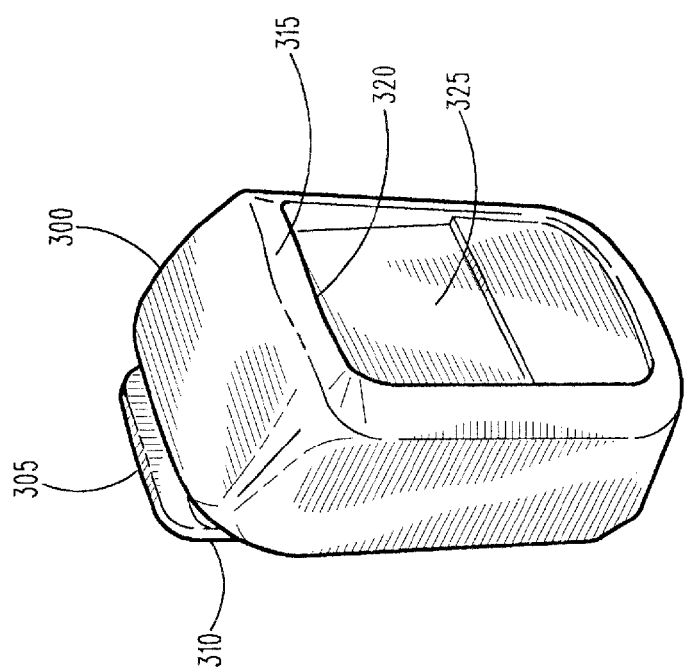
FIG. 4a shows a module for the mobile unit of the latching system of FIG. 1 according to an exemplary embodiment of the present invention.

FIG. 4*a* shows a module 300 for the MU 100 of the latching system of FIG. 1 according to an exemplary embodiment of the present invention. The module 300 may provide additional functionalities for the MU 100. For example, the module 300 may be a radio frequency identification (RFID) module, a magnetic stripe reader (MSR), a debit MSR that includes a data input arrangement, a near field communications reader such as Smart Cards, a vehicle cradle optionally with an extended support, a desk stand, a charging accessory, a serial or USB printer cable, etc.

The electronic components of the module 300 may include respective components depending on a type of the module 300. For example, the RFID module or the near field communications reader may include a transceiver. In another example, the MSR may include an area to swipe a credit card. In yet another example, the debit MSR may include the data input arrangement. With regard to the housing of the module 300 and its relation to the MU 100, the module 300 may include substantially similar components to the MU 100 and the latch 150. For example, the module 300 may include a module hook 305, a module panel 310, a module loop 315, a module via 320, and a module recess 325. These components may function in a substantially similar manner to their counterparts of the MU 100 and the latch 150 (i.e., the hook 165, the panel 170, the loop 115, the via 120, and the recess 125, respectively).

As illustrated, the module 300 may be an intermediary. That is, the module 300 may be disposed between the MU 100 and the latch 150 and still provide the coupling. Specifically, the module recess 325 may include electronic and physical components substantially similar to the recess 125 so that when the latch 150 couples to the module 300, an electronic and physical connection is established. Furthermore, the module panel 310 may include substantially similar electronic and physical components to the panel 170 so that when the module 300 couples to the MU 100, an electronic and physical connection is established. As illustrated, the module hook 305 and the module panel 310 may be disposed on an opposite side of the module housing from the module loop 315, the module via 320, and the module recess 325.

It should be noted that the module 300 including the additional components of the module loop 315, the module via 320, and the module recess 325 is only exemplary. That is, the module 300 may include only the module hook 305 and the module panel 310 so that the module 300 only couples to the MU 100.

FIG. 4*b* shows an assembled view of the MU 100 of the latching system of FIG. 1 and the module 300 of FIG. 4*a* according to an exemplary embodiment of the present invention. As discussed above, the module 300 may be coupled to the MU 100 in a substantially similar manner as the latch 150 coupling to the MU 100. Thus, the module hook 305 may be placed through the via 120 of the loop 115 in the hooking position. Subsequently, the MU 100 may be pivoted so that the module panel 310 is received in the recess 125 of the MU 100. As illustrated, the module loop 315, the module via 320, and the module recess 325 are disposed on an opposite from the coupling area of the module 300 with the MU 100.

Figure 4C:
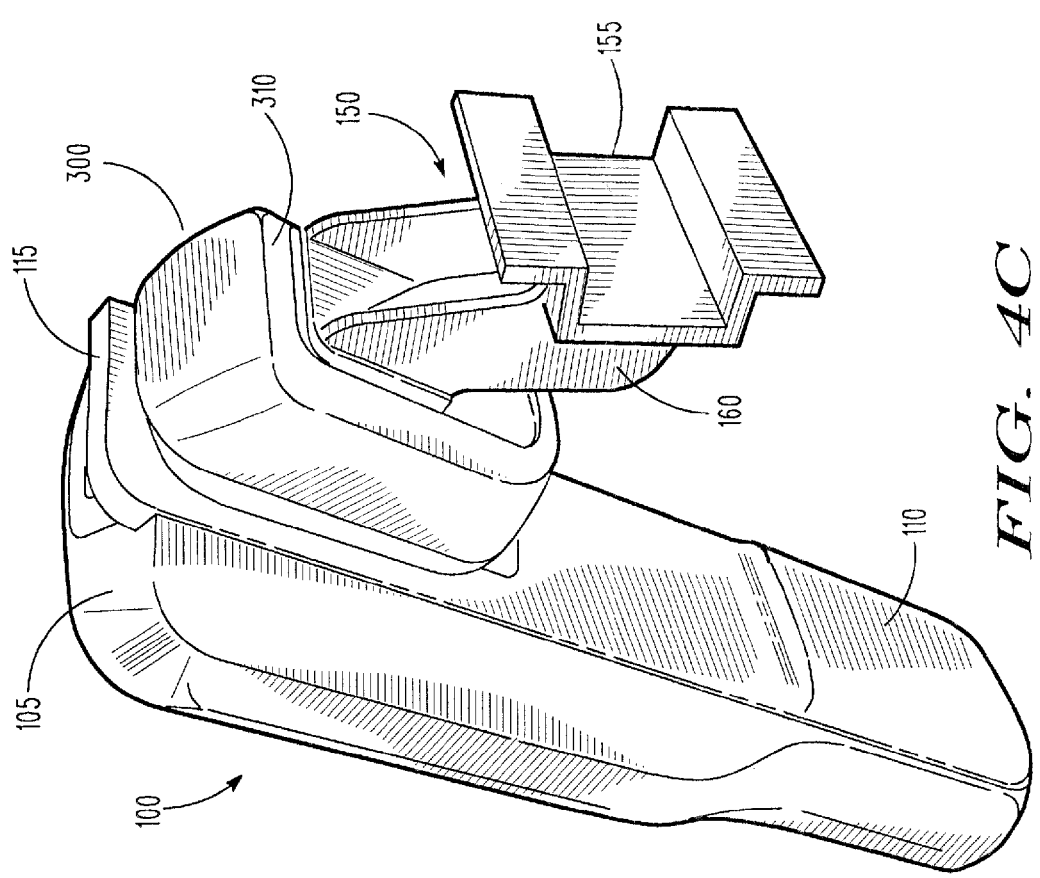
FIG. 4c shows a pivoted position for the assembled mobile unit with the module of FIG. 4b and the latch of the latching system of FIG. 1 according to an exemplary embodiment of the present invention.

FIG. 4*c* shows a pivoted position for the assembled MU 100 with the module 300 of FIG. 4*b* and the latch 150 of the latching system of FIG. 1 according to an exemplary embodiment of the present invention. As discussed above, the module 300 may include the module loop 315, the module 320, and the module recess 325 to further be disposed as an intermediary between the MU 100 and the latch 150. Thus, the hook 165 may be received through the module via 320 of the module loop 315 in the hooking position. The assembled MU 100 with the module 300 may be pivoted so that the panel 170 is received in the module recess 325, thereby creating an electronic and physical connection.

Figure 5A:
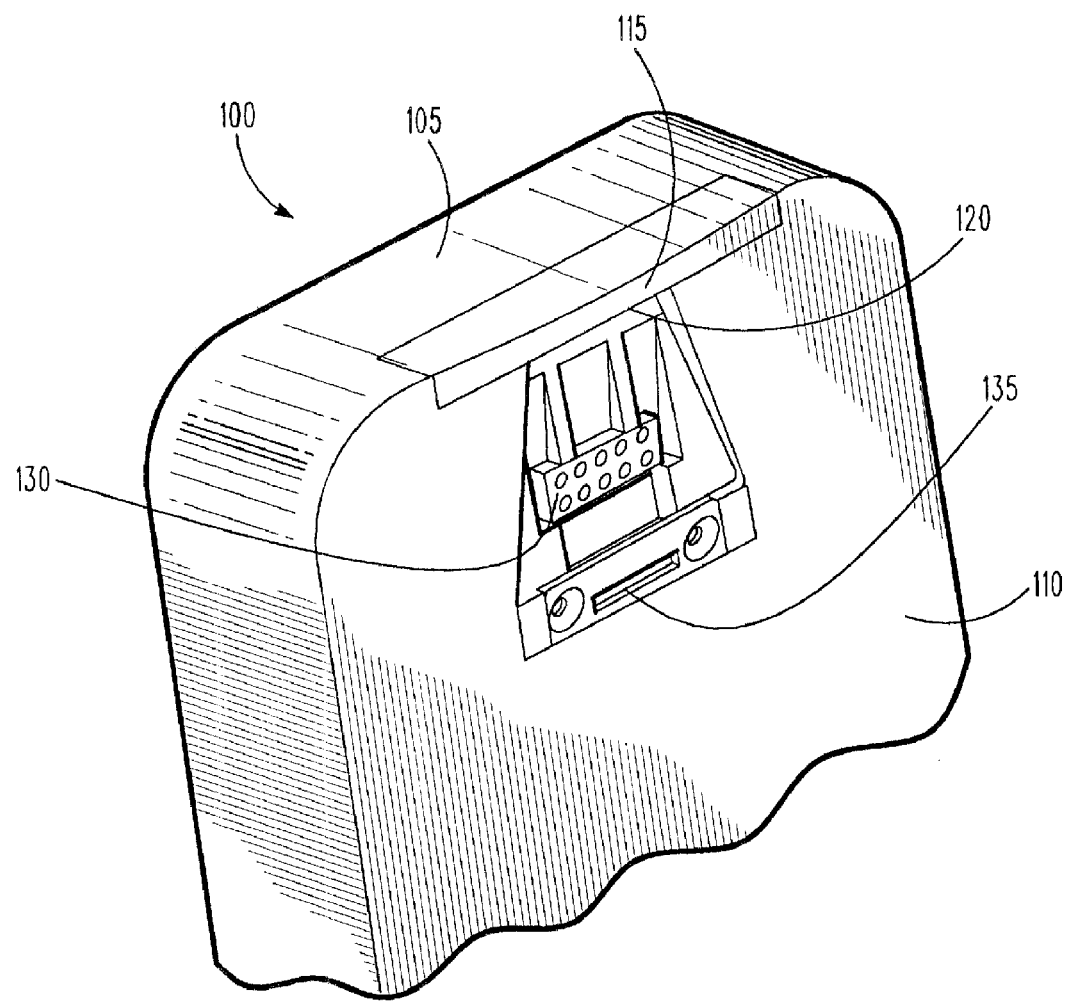
FIG. 5a shows a first set of contacts and a first locking mechanism of the mobile unit of the latching system of FIG. 1 according to an exemplary embodiment of the present invention.

FIG. 5*a* shows a first set of contacts 130 and a first locking mechanism 135 of the MU 100 of the latching system of FIG. 1 according to an exemplary embodiment of the present invention. As discussed above, the recess 125 of the MU 100 may include electronic and physical components to enable an electronic connection and a securing to be established. The first set of contacts 130 may correspond to the electronic components while the first locking mechanism 135 may correspond to the physical components. It should be noted that the use of the first locking mechanism 135 is only exemplary.

In another exemplary embodiment of the present invention, the hook and pivot latching system may provide a secure enough coupling of the MU 100 and the latch 150 that an additional locking mechanism may not be necessary.

The first set of contacts 130 may be any conventional type of contacts. As illustrated, the first set of contacts 130 may be recesses that receive corresponding pins. In other examples, the first set of contacts 130 may be flat contacts, button contacts, pins, etc. The first locking mechanism 135 may be any conventional type of locking mechanism. As illustrated, the first locking mechanism 135 may be a recess that receives a latch. In other examples, the first locking mechanism 135 may be a magnet, a solenoid, hook and loop fasteners, etc.

As discussed above, the module recess 325 may be substantially similar to the recess 125 of the MU 100. Therefore, it should be noted that the first set of contacts 130 and the first locking mechanism 135 may also correspond to the electronic and physical components included in the module recess 325.

Figure 5B:
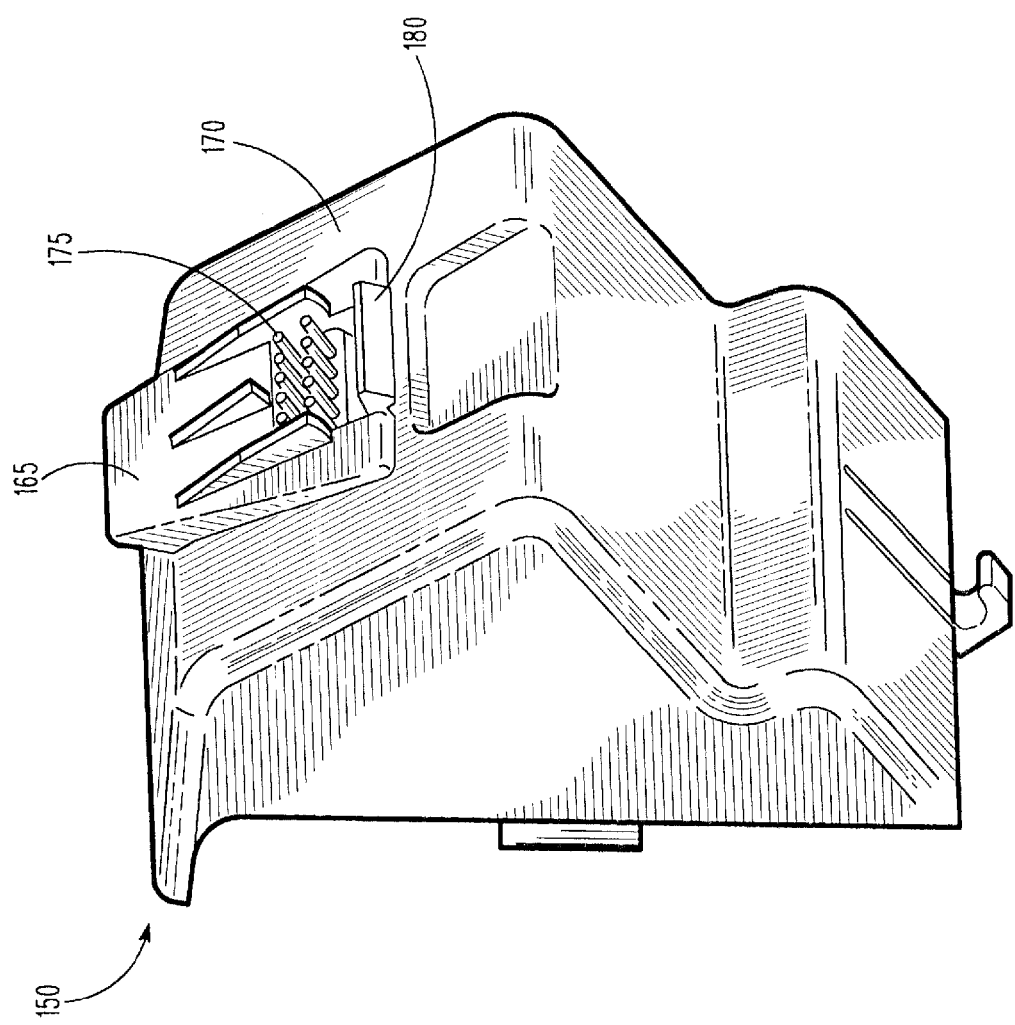
FIG. 5b shows a second set of contacts and a second locking mechanism of the latch of the latching system of FIG. 1 according to an exemplary embodiment of the present invention.

FIG. 5b shows a second set of contacts 175 and a second locking mechanism 180 of the latch 150 of the latching system of FIG. 1 according to an exemplary embodiment of the present invention. As discussed above, the panel 170 of the latch 150 may include corresponding electronic and physical components to enable an electronic connection and a securing to be established. The second set of contacts 175 may correspond to the electronic components while the second locking mechanism 180 may correspond to the physical components. It should again be noted that the use of the second locking mechanism 180 is only exemplary. In another exemplary embodiment of the present invention, the hook and pivot latching system may provide a secure enough coupling of the MU 100 and the latch 150 that an additional locking mechanism may not be necessary. For example, a combination of a weight of the MU and an angular orientation may provide enough support for the MU 100 to couple with the latch 150.

The second set of contacts 175 may also be any conventional, corresponding type of contacts. As illustrated, the second set of contacts 175 may be pins that are received by the corresponding recesses of the first set of contacts 130. In other examples, the second set of contacts 175 may be flat contacts, button contacts, recesses, etc. The second locking mechanism 180 may be any conventional type of locking mechanism. As illustrated, the second locking mechanism 180 may be a latch that is received by the recess of the first locking mechanism 135. In other examples, the second locking mechanism 180 may be a magnet, a solenoid, hook and loop fasteners, etc.

Again it should be noted that the first and second locking mechanisms may not be necessary. According to the above described exemplary embodiments, the MU is disposed at an angle with reference to the attaching component 155 which is coupled to a rail, a wall, etc. Thus, the first and second locking mechanisms may be useful. However, those skilled in the art will understand that the angled disposition is only exemplary. In another exemplary embodiment, the MU may be disposed parallel to the attaching component 155. In such an embodiment, the first and second locking mechanisms may be used. However, the recess 125 receiving the panel 170 may provide enough support with the hook 165 has been received by the loop 115.

As discussed above, the module panel 310 may be substantially similar to the panel 170 of the latch 150. Therefore, it should be noted that the second set of contacts 175 and the second locking mechanism 180 may also correspond to the electronic and physical components included in the module panel 310.

Figure 5C:
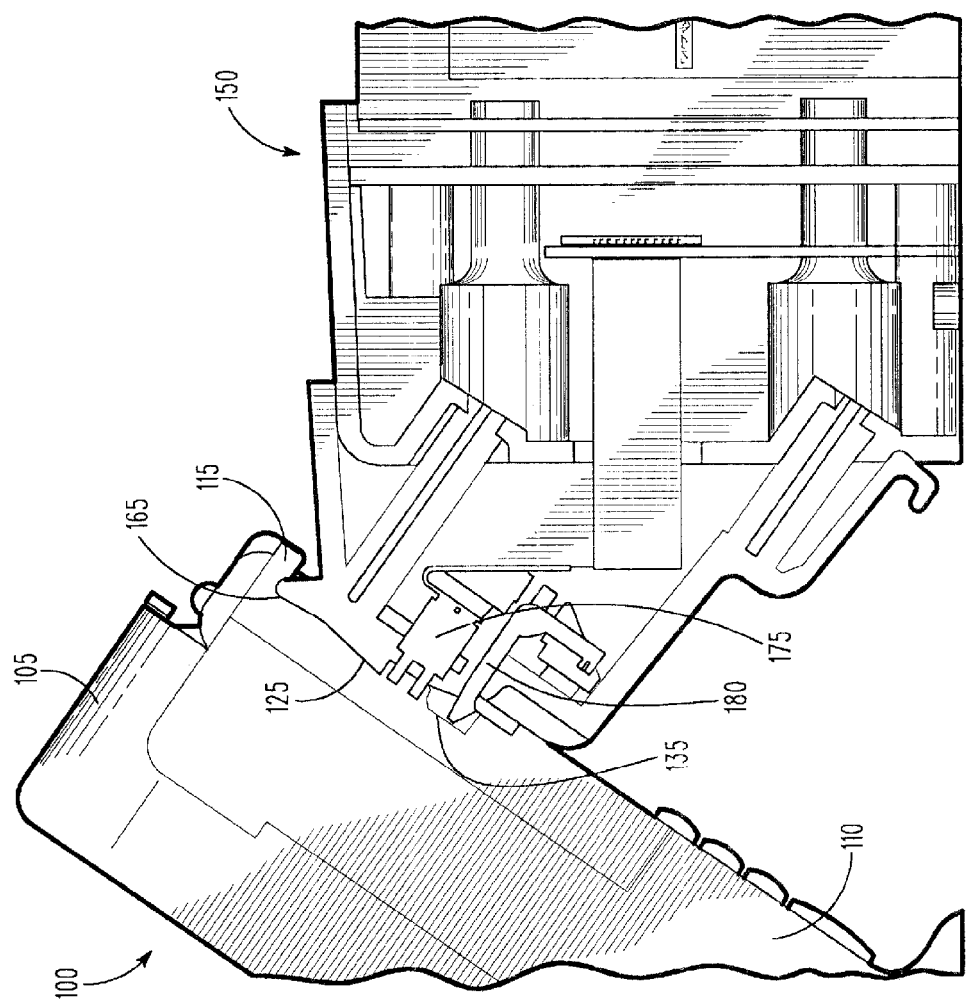
FIG. 5c shows a cross sectional view of an assembled position of the mobile unit and the latch of the latching system of FIG. 1 according to an exemplary embodiment of the present invention.

FIG. 5c shows a cross sectional view of an assembled position of the MU 100 and the latch 150 of the latching system of FIG. 1 according to an exemplary embodiment of the present invention. As illustrated, the first set of contacts 130 of the recess 125 of the MU 100 have received the second set of contacts 175 of the panel 170 of the latch 150. Furthermore, the first locking mechanism 135 of the recess 125 of the MU 100 has received the second locking mechanism 180 of the panel 170 of the latch 150. The hook 165 being received in the via 120 of the loop 115 is also illustrated.

In this coupling of the first set of contacts 130 with the second set of contacts 175, an electrical connection may be established between the MU 100 and the latch 150. As discussed above, the latch 150 may further be electrically connected. This further connection may be to a network device. The direct coupling of the first set of contacts 130 and the second set of contacts 175 eliminate any need for connectors. Thus, a high speed connection interface may be used.

The first locking mechanism 135 coupling with the second locking mechanism 180 may securely hold the MU 100 with the latch 150. As illustrated, the second locking mechanism 180 may include a further hook for the security of the coupling. The MU 100 and/or the latch 150 may include a release mechanism. For example, a button may be included so that the hook portion of the second locking mechanism 180 is lifted to enable the MU 100 to be removed from the coupling of the latch 150.

Figure 6:
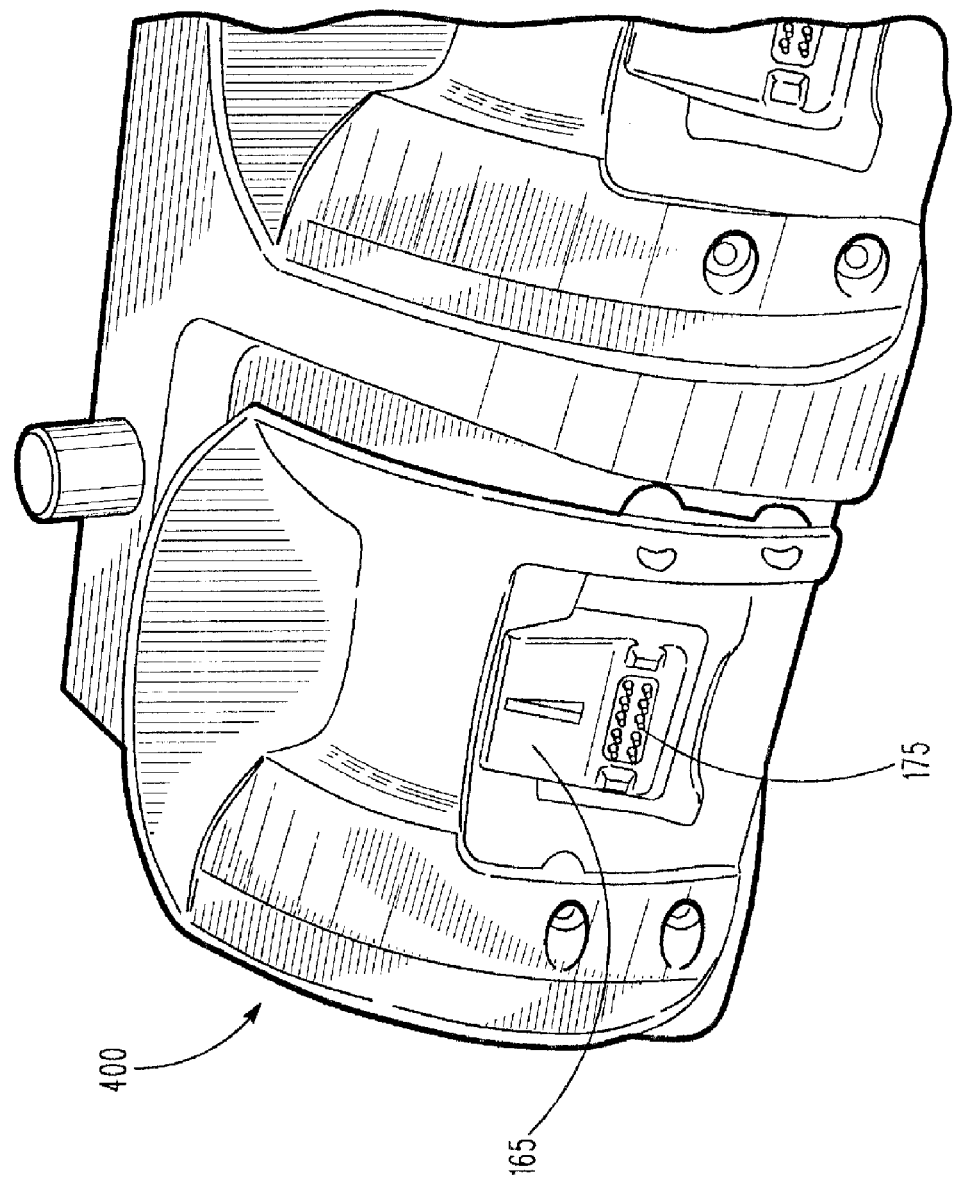
FIG. 6 shows a guiding mold for the latching system of FIG. 1 according to an exemplary embodiment of the present invention.

FIG. 6 shows a guiding mold 400 for the latching system of FIG. 1 according to an exemplary embodiment of the present invention. The guiding mold 400 may be a permanent fixture or a detachable component which couples to the latch 150. The guiding mold 400 may provide a range of movement that coincides with a pivoting that the MU is required to perform for the latching system. The guiding mold 400 may enable a proper pivoting of the MU as well as providing instruction for initial users.

The exemplary embodiments of the present invention enable a mobile device to perform the functionalities associated with a conventional cradle without using the cradle. The MU may include a loop to receive a hook from a latch. The MU may subsequently be pivoted around the coupling point to secure the coupling of the MU with the latch. According to the exemplary embodiments of the present invention, the loop may be disposed at a top portion of the MU. The MU may include electrical contacts to couple to corresponding electrical contacts of the latch to thereby establish an electrical connection. The hook and pivot latching system of the exemplary embodiments of the present invention enable a cost efficient (e.g., less materials necessary for the latch) way of securely "cradling" the MU. Furthermore, less space is required for the latch than the conventional cradle. Thus, the width of the MU determines the space necessary to secure the MU when multiple MUs are securely placed on a rail. In addition, the direct coupling of the electrical connection enables high speed connection interface to be used.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A housing of a mobile unit for coupling to a latch, the housing comprising:
 a loop disposed on a top portion of the housing and receiving a hook of the latch; and
 a panel disposed on a back portion of the housing receiving a corresponding panel of the latch, the panel including a first set of electrical contacts that couple to a second set of electrical contacts of the corresponding panel to establish an electrical connection, wherein the loop is contoured to enable a pivoting motion around a point where the loop and the hook contact.

2. The housing of claim 1, wherein the pivoting motion corresponds to a shape of a guiding mold coupled to the latch.

3. The housing of claim 1, wherein the electrical connection is used to exchange data between the mobile unit and a further device, the further device being in communication with the latch.

4. The housing of claim 1, further comprising:
a first locking mechanism coupling to a corresponding locking mechanism of the latch.

5. The housing of claim 4, wherein the first locking mechanism is disposed on the panel.

6. The housing of claim 4, wherein the housing couples to the latch of a module that adds a functionality to the mobile unit.

7. The housing of claim 6, wherein the functionality is one of a radio frequency identification (RFID) module, a magnetic stripe reader (MSR), a debit MSR having a data input arrangement, a near field communications reader, a charging accessory, a serial printer cable, and a universal serial bus (USB) printer cable.

8. A latch for coupling to a housing of a mobile unit, comprising:
a hook disposed at an end of an extension from an attaching mechanism, the hook being received by a loop disposed on a top portion of the housing; and
a panel disposed at the end of the extension being received by a corresponding panel of the housing, the panel including a first set of electrical contacts that couple to a second set of electrical contacts of the corresponding panel to establish an electrical connection, wherein the hook is contoured to enable a pivoting motion around a point where the loop and the hook contact.

9. The latch of claim 8, further comprising:
a guiding feature having a shape corresponding to the pivoting motion.

10. The latch of claim 8, wherein the latch is in communication with a further device so that the electrical connection is used to exchange data between the mobile unit and the further device.

11. The latch of claim 8, further comprising:
a first locking mechanism coupling to a corresponding locking mechanism of the housing.

12. The latch of claim 11, wherein the first locking mechanism is disposed on the panel.

13. The latch of claim 11, wherein the latch is part of a module that couples to the housing to add a functionality to the mobile unit.

14. The latch of claim 13, wherein the functionality is one of a RFID module, a MSR, a debit MSR having a data input arrangement, a near field communications reader, a charging accessory, a serial printer cable, and a USB cable.

15. The latch of claim 8, wherein the hook has a shape corresponding to a shape of the loop, the hook being replaceable with a further hook which shape corresponds to a shape of a further loop, the shape of the further loop being different than the shape of the loop.

16. A system, comprising:
a housing of a mobile unit comprising a loop disposed on a top portion of the housing and a first panel disposed on a back portion of the housing, the panel including a first set of electrical contacts; and
a latch comprising a hook disposed at an end of an extension from an attaching mechanism and a second panel disposed at the end of the extension, the panel including a second set of electrical contacts,
wherein the first panel receives the second panel so that the first set of electrical contacts couple to the second set of electrical contacts to establish an electrical connection, wherein the electrical connection is used to exchange data between the mobile unit and a further device, the further device being in communication with the latch.

17. The system of claim 16, wherein the housing couples to a first side of a module and the latch couples to a second side of the module, the module being disposed between the housing and the latch, the module comprising a module hook and a first module panel on the first side and a module loop and a second module panel on the second side.

18. The system of claim 17, wherein the loop receives the module hook, the first panel receives the first module panel, the first module panel including a third set of electrical contacts coupling to the first set of electrical contacts, the hook being received by the module loop, the second panel being received by the second module panel, the second module panel including a fourth set of electrical contacts coupling to the second set of electrical contacts.

19. The system of claim 17, wherein the module adds a functionality to the mobile unit, the functionality being one of a RFID module, a MSR, a debit MSR having a data input arrangement, a near field communications reader, a charging accessory, a serial printer cable, and a USB printer cable.

* * * * *